(12) United States Patent
Horng et al.

(10) Patent No.: US 9,356,481 B2
(45) Date of Patent: May 31, 2016

(54) ROTOR STRUCTURE FOR A MOTOR

(71) Applicant: SUNONWEALTH ELECTRIC MACHINE INDUSTRY CO., LTD, Kaohsiung (TW)

(72) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 320 days.

(21) Appl. No.: 14/194,906

(22) Filed: Mar. 3, 2014

(65) Prior Publication Data

US 2014/0175929 A1     Jun. 26, 2014

Related U.S. Application Data

(60) Division of application No. 12/951,123, filed on Nov. 22, 2010, now abandoned, which is a continuation-in-part of application No. 12/145,603, filed on Jun. 25, 2008, now abandoned.

(30) Foreign Application Priority Data

May 15, 2008    (TW) ................................ 97117819 A

(51) Int. Cl.
*H02K 1/28*     (2006.01)
*H02K 1/27*     (2006.01)
*H02K 21/12*    (2006.01)

(52) U.S. Cl.
CPC ................ *H02K 1/28* (2013.01); *H02K 1/2733* (2013.01)

(58) Field of Classification Search
CPC ......... H02K 21/12; H02K 21/14; H02K 1/27; H02K 1/2706; H02K 1/2726; H02K 1/28

USPC ............ 310/156.08, 156.09, 156.12, 156.13, 310/91, 402, 403, 404, 400, 261.1, 265

See application file for complete search history.

(56) References Cited

U.S. PATENT DOCUMENTS

| | | | |
|---|---|---|---|
| 4,639,627 A | | 1/1987 | Takekoshi et al. |
| 5,142,180 A | | 8/1992 | Moore et al. |
| 5,258,678 A | * | 11/1993 | Futami .................... H02K 1/276 310/156.53 |
| 5,298,826 A | * | 3/1994 | Lee ....................... H02K 1/2733 310/156.09 |
| 6,437,474 B1 | * | 8/2002 | Chu ......................... H02K 1/28 310/261.1 |
| 6,814,209 B1 | * | 11/2004 | Acosta ................... H02K 7/102 310/83 |
| 7,075,213 B2 | | 7/2006 | Krill |
| 2004/0080217 A1 | | 4/2004 | Ota et al. |
| 2006/0038457 A1 | * | 2/2006 | Miyata .................... H02K 1/278 310/156.45 |
| 2007/0159030 A1 | | 7/2007 | Naganuma et al. |
| 2007/0194648 A1 | | 8/2007 | Evans et al. |
| 2008/0179980 A1 | * | 7/2008 | Dawsey ............... H02K 1/2766 310/156.53 |
| 2009/0284094 A1 | | 11/2009 | Horng et al. |

* cited by examiner

*Primary Examiner* — Michael Andrews
(74) *Attorney, Agent, or Firm* — Alan D. Kamrath; Kamrath IP Lawfirm, P.A.

(57) ABSTRACT

A rotor structure for a motor includes a shaft, a single magnet and two fixing seats. The single magnet has two opposite end faces. An axial hole has a maximum extent equal to a maximum extent between the two opposite end faces. At least one of the two opposite end faces has a first engaging member. The magnet and each opposite end face have a maximum radial extent. Each fixing seat includes an abutting face having a maximum radial extent the same as the maximum radial extent of the single magnet and of the opposite end faces. One of the abutting faces has a second engaging member. The first engaging member is located at the maximum radial extent at the outer edge of the at least one of the two opposite end faces, or located at the inner edge of the at least one of the two opposite end faces.

10 Claims, 10 Drawing Sheets

ROTOR STRUCTURE FOR A MOTOR

CROSS REFERENCE TO RELATED APPLICATIONS

This is a divisional application of U.S. patent application Ser. No. 12/951,123 filed on Nov. 22, 2010.

BACKGROUND OF THE INVENTION

1. Field of the Invention

The present invention relates to a rotor structure for a motor and, more particularly, to a rotor structure that includes fixing seats securely coupling a shaft and a magnet together.

2. Description of the Related Art

As shown in FIG. 1, a conventional rotor structure for a brushless motor includes a shaft 10 and a magnet 20. The magnet 20 is in a shape of a cylinder with an axial hole 21 extending through the magnet 20 along a centerline of the cylinder for the shaft 10 to pass through said axial hole 21. Conventionally, there are two ways to provide a linkage between the shaft 10 and the magnet 20, which are linkages realized through "tight-fit design" or through "adhesive" and are discussed in detail as follow.

The linkage between the shaft 10 and magnet 20 provided by "tight-fit design" is achieved by arranging the axial hole 21 of the magnet 20 tightly fitting the shaft 10, in a way such that the magnet 20 is coupled with the shaft 10 and able to synchronously revolve therewith. However, owing to the fragility of the magnet 20, coupling the shaft 10 and the magnet 20 by "tight-fit design" leads the magnet 20 to rupture easily. Moreover, if the magnet 20 does not fit the shaft 10 tightly enough, the shaft 10 may be disengaged from the magnet 20 due to temperature-induced expansion and contraction. Also, disengagement between the shaft 10 and the magnet 20 will further cause the magnet 20 to be unable to synchronously revolve with the shaft 10.

Linking the shaft 10 and the magnet 20 through "adhesive" is achieved by applying adhesive between the shaft 10 and the axial hole 21 of the magnet 20, such that the magnet 20 is coupled with the shaft 10 and able to synchronously revolve therewith. However, the lifetime of the applied adhesive is limited, which will not be able to provide stickiness when the lifetime thereof is ended. Besides, since the rotor structure is ordinarily operated under high temperature and high rotational speed, the lifetime of said adhesive is easily shortened.

Accordingly, there is a need for redesigning the conventional rotor structure.

SUMMARY OF THE INVENTION

The primary objective of this invention is to provide a rotor structure for a motor having two fixing seats jointly positioning a magnet at a predetermined position relative to a shaft, with an axial hole of the magnet fitting with a small clearance or loosely fitting the shaft, and the fixing seats tightly fitting said shaft. Accordingly, the magnet is prevented from rupturing or from being unable to synchronously revolve with the shaft owing to disengagement between the shaft and the magnet.

The secondary objective of this invention is to provide the rotor structure for a motor in which two end faces of the magnet and two abutting faces of said fixing seats are formed with rough surfaces or corresponding grooves and protrusions, to achieve a stable-engaging effect between the magnet and the fixing seats.

In an embodiment of the invention, a rotor structure for a motor comprises a shaft, a single magnet and two fixing seats. The single magnet has two opposite end faces. An axial hole extends along an axis through said two opposite end faces and has a maximum extent parallel to the axis equal to a maximum extent parallel to the axis between the two opposite end faces. At least one of the two opposite end faces has at least one first engaging member being a groove extending parallel to the axis into the at least one of the two opposite end faces. The single magnet and each of the two opposite end faces of the single magnet have a maximum radial extent perpendicular to the axis. Each fixing seat has an abutting face. Each of the abutting faces has a maximum radial extent perpendicular to the axis the same as the maximum radial extent of the single magnet and of the two opposite end faces of the single magnet. At least one of the abutting faces faces said at least one of the two opposite end faces and has at least one second engaging member facing and engaging with said at least one first engaging member. A positioning hole is disposed at the center of the abutting face. The two fixing seats have circular cross sections perpendicular to the positioning hole and to the axis. The shaft passes through the axial hole of the single magnet and the positioning holes of the two fixing seats. The two fixing seats are adjacent to and abut against the end faces of the single magnet by the abutting faces respectively to position the single magnet relatively to the shaft. Both the positioning holes of the two fixing seats have a diameter smaller than that of said shaft to tightly fit said shaft. The at least one first engaging member is located at the maximum radial extent at the outer edge of the at least one of the two opposite end faces, or located at the inner edge of the at least one of the two opposite end faces.

In a form shown, the axial hole of the single magnet has an equal diameter with the shaft.

In the form shown, the axial hole of the single magnet has a diameter larger than that of the shaft to loosely fit the shaft.

In the form shown, the at least one second engaging member is at least one protrusion.

In the form shown, each of the two opposite end faces of the single magnet is formed with a rough surface, the abutting face is formed with a rough surface, and the rough surfaces of the two opposite end faces and the abutting face provide friction therebetween to stably link the shaft and the single magnet.

In another embodiment of the invention, a rotor structure for a motor comprises a shaft, a single magnet and two fixing seats. The single magnet has two opposite end faces. An axial hole extends along an axis through said two opposite end faces and has a maximum extent parallel to the axis equal to a maximum extent parallel to the axis between the two opposite end faces. At least one of the two opposite end faces has at least one first engaging member being a protrusion extending parallel to the axis from the at least one of the two opposite end faces. The single magnet and each of the two opposite end faces of the single magnet have a maximum radial extent perpendicular to the axis. Each fixing seat has an abutting face. Each of the abutting faces has a maximum radial extent perpendicular to the axis the same as the maximum radial extent of the single magnet and of the two opposite end faces of the single magnet. At least one of the abutting faces faces said at least one of the two opposite end faces and has at least one second engaging member facing and engaging with said at least one first engaging member. A positioning hole is disposed at the center of the abutting face. The two fixing seats have circular cross sections perpendicular to the positioning hole and to the axis. The shaft passes through the axial hole of the single magnet and the positioning holes of the two fixing seats. The two fixing seats are adjacent to and abut against the end faces of the single magnet by the abutting faces respectively to position the single magnet relatively to the shaft. Both the positioning holes of the two fixing seats have a diameter smaller than that of said shaft to tightly fit said shaft. The protrusion is at an inner edge or an outer edge of the at least one of the two opposite end faces.

In a form shown, the at least one second engaging member is at least one groove.

In the form shown, the axial hole of the single magnet has an equal diameter with the shaft.

In the form shown, the axial hole of the single magnet has a diameter larger than that of the shaft to loosely fit the shaft.

In the form shown, each of the two opposite end faces of the single magnet is formed with a rough surface, the abutting face is formed with a rough surface, and the rough surfaces of the two opposite end faces and the abutting face provide friction therebetween to stably link the shaft and the single magnet.

BRIEF DESCRIPTION OF THE DRAWINGS

The present invention will become more fully understood from the detailed description given hereinafter, and the accompanying drawings that are given by way of illustration only and are not limitations of the present invention, wherein.

Figure 1:
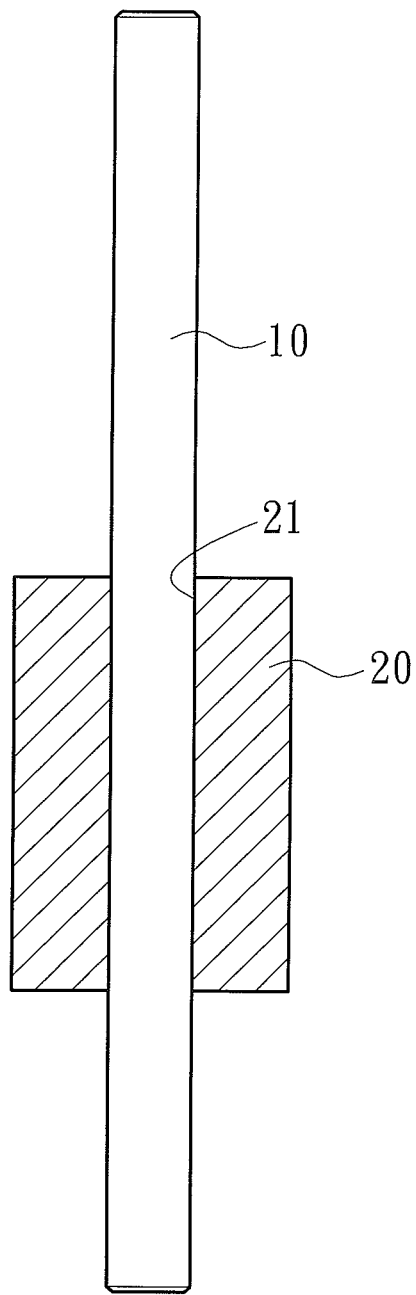
FIG. 1 is a cross-sectional side view illustrating a conventional rotor structure for a motor.

In the various figures of the drawings, the same numerals designate the same or similar parts. Furthermore, when the terms "first", "second" and similar terms are used hereinafter, it should be understood that these terms refer only to the structure shown in the drawings as it would appear to a person viewing the drawings and are utilized only to facilitate describing the invention.

DETAILED DESCRIPTION OF THE INVENTION

Figure 2:
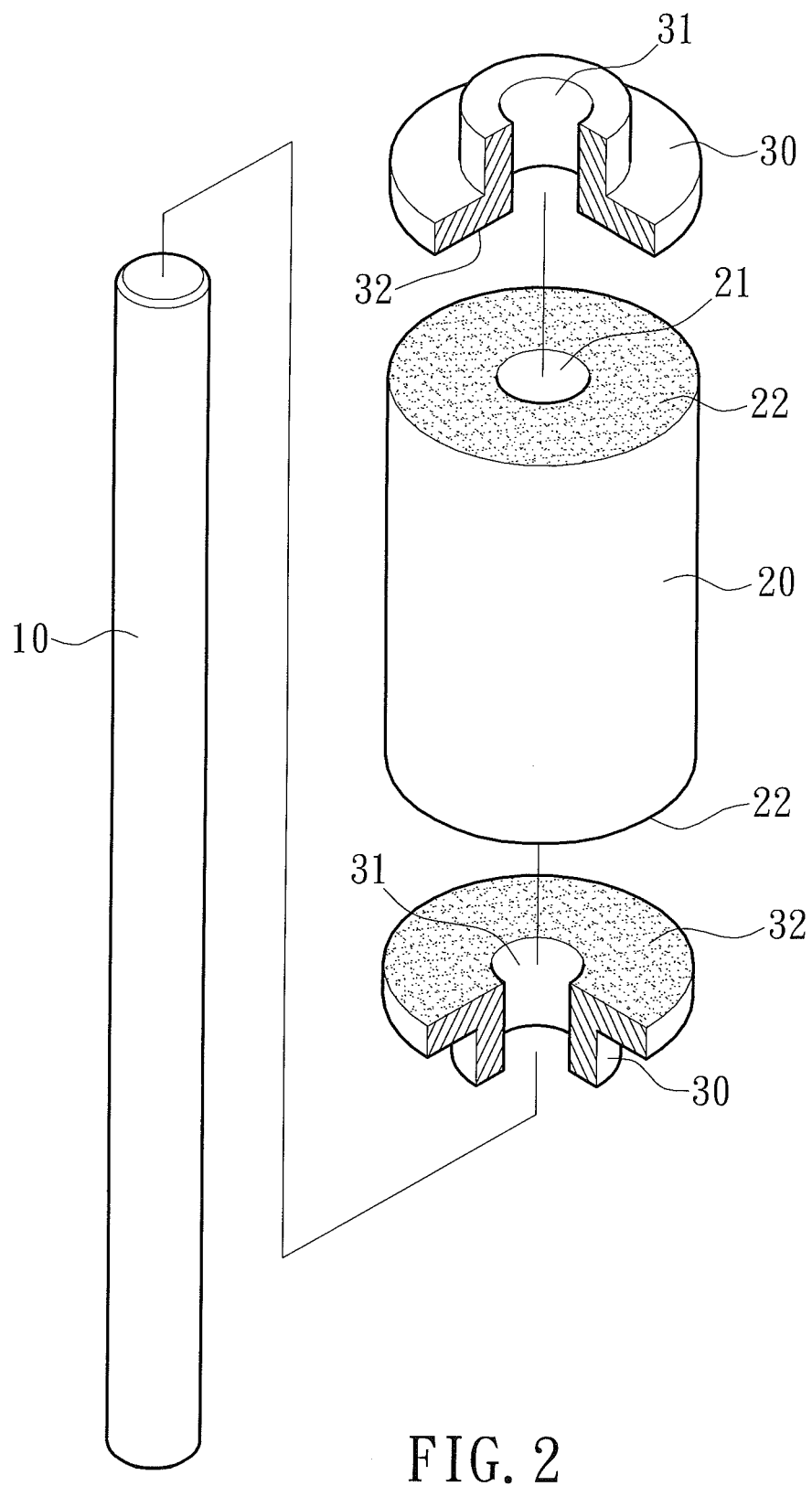
FIG. 2 is an exploded perspective view illustrating a rotor structure for a motor in accordance with a first embodiment of the present invention.
Figure 3:
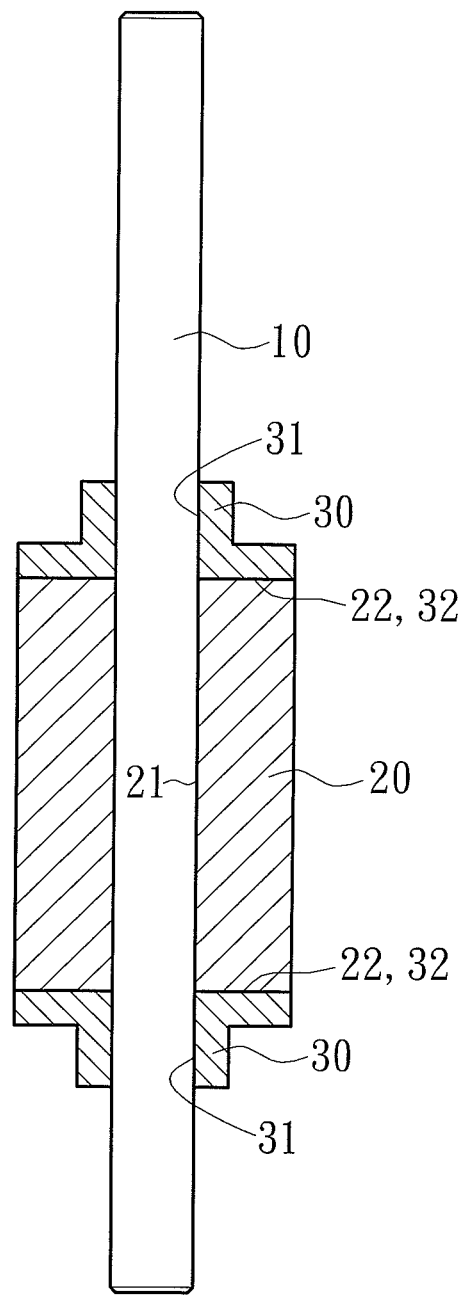
FIG. 3 is a cross-sectional side view illustrating the rotor structure for a motor in accordance with the first embodiment of the present invention.

Referring now to FIGS. 2 and 3, a rotor structure for a motor in accordance with a first embodiment is illustrated. The rotor structure includes a shaft 10, a magnet 20 and two fixing seats 30. The shaft 10 is in a shape of a cylindrical stick. The magnet 20 is in a shape of cylinder and has an axial hole 21 and two opposite end faces 22, with the axial hole 21 extending between centers of said two end faces 22 and with each of the end faces 22 being formed with a rough surface. Each fixing seat 30 has an abutting face 32 also formed with a rough surface and a positioning hole 31 disposed at the center of the abutting face 32.

In assembly, the shaft 10 passes through the axial hole 21 of the magnet 20 and the positioning holes 31 of the fixing seats 30, with the two fixing seats 30 being adjacent to, and abutting against, the end faces 22 of the magnet 20 by the abutting faces 32, respectively. Furthermore, the axial hole 21 of the magnet 20 fits with a small clearance or loosely fits the shaft 10, and both positioning holes 31 of the fixing seats 30 tightly fit said shaft 10. Specifically, the axial hole 21 of the magnet 20 has a diameter substantially equal to, or slightly larger than, a diameter of the shaft 10, and both positioning holes 31 of the fixing seats 30 have a diameter smaller than the diameter of the shaft 10. For example, the shaft 10 may have a diameter of 1 cm, the axial hole 21 of the magnet 20 may have a diameter of 1 to 1.03 cm, and the both positioning holes 31 may have a diameter of 0.95 cm. The two fixing seats 30 can thereby jointly position the magnet 20 at a predetermined position relative to the shaft 10. Besides, great friction between the abutting faces 32 of the fixing seats 30 and the end faces 22 of the magnet 20 is provided through the rough surfaces thereof. As a result, a stable linkage between the shaft 10 and the magnet 20 is achieved, and the magnet 20 is therefore able to synchronously revolve with the shaft 10.

Figure 4:
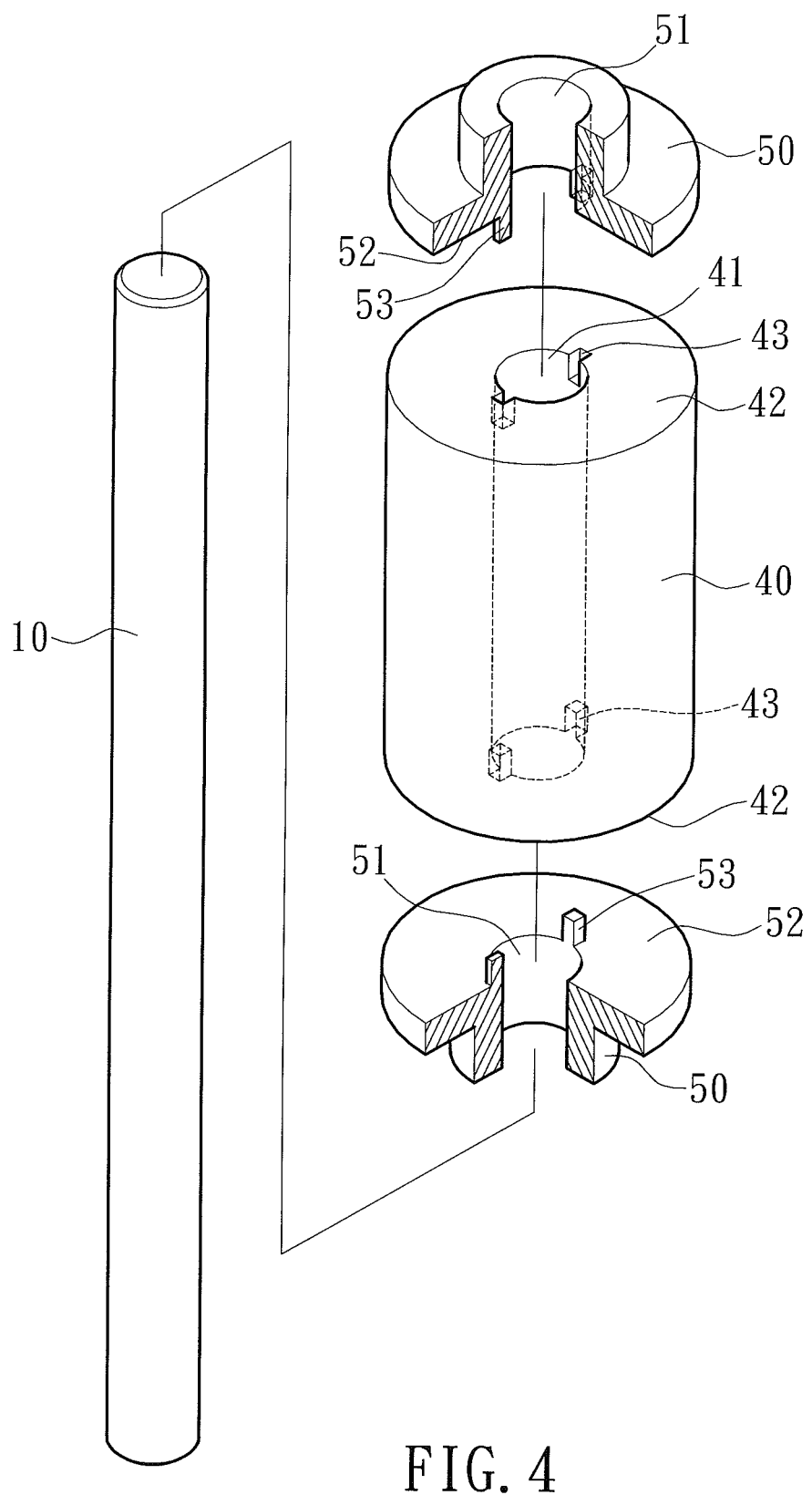
FIG. 4 is an exploded perspective view illustrating a rotor structure for a motor in accordance with a configuration of a second embodiment of the present invention.
Figure 5:
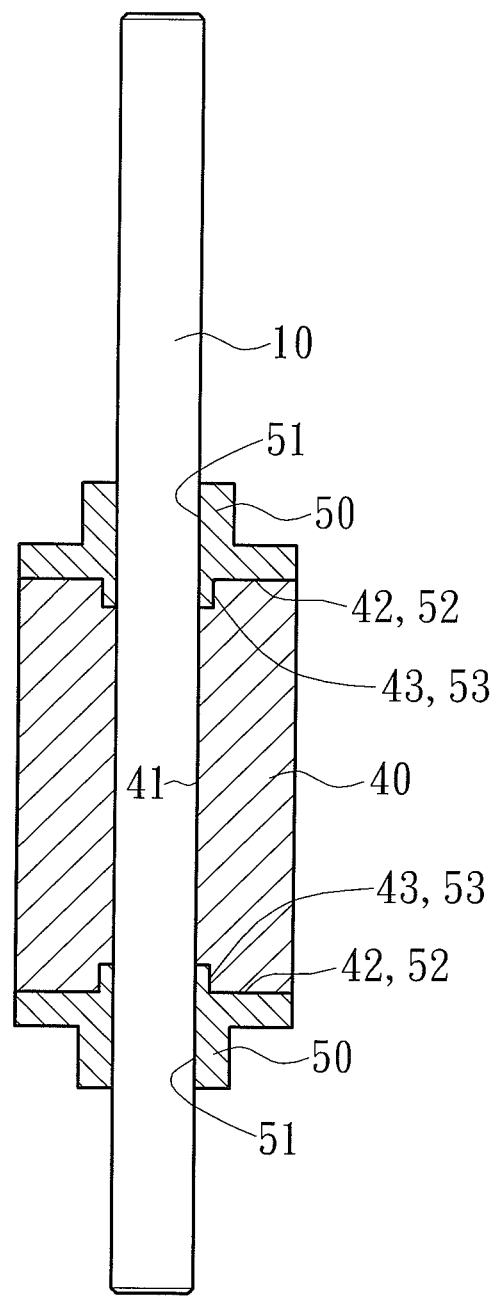
FIG. 5 is a cross-sectional side view illustrating the rotor structure for a motor in accordance with the configuration of the second embodiment of the present invention.

Referring now to FIGS. 4 and 5, a rotor structure for a motor in accordance with a configuration of a second embodiment is illustrated. The rotor structure also includes the shaft 10, a magnet 40 and two fixing seats 50. The magnet 40 has an axial hole 41 and two opposite end faces 42, with the axial hole 41 extending between said two end faces 42. Each fixing seat 50 has an abutting face 52 and a positioning hole 51 disposed at the center of the abutting face 52. In assembly, the shaft 10 passes through the axial hole 41 of the magnet 40 and the positioning holes 51 of the fixing seats 50, with the two fixing seats 50 being adjacent to, and abutting against, the end faces 42 of the magnet 40 by the abutting faces 52, respectively, for jointly positioning the magnet 40 at a predetermined position relative to the shaft 10. Furthermore, the axial hole 41 of the magnet 40 fits with a small clearance or loosely fits the shaft 10, and both positioning holes 51 of the fixing seats 50 tightly fit said shaft 10. Similarly to the above first embodiment, the axial hole 41 of the magnet 40 has a diameter substantially equal to, or slightly larger than, a diameter of the shaft 10, and both positioning holes 51 of the fixing seats 50 have a diameter smaller than the diameter of the shaft 10. What is different from the rotor structure of the first embodiment is that each of the end faces 42 has at least one first engaging member 43, while each of the abutting faces 52 has at least one second engaging member 53 facing and engaging with said at least one first engaging member 43. The at least one first engaging member 43 is preferably selected from at least one groove or protrusion, with the at least one second engaging member 53 being correspondingly selected from at least one protrusion or groove. Besides, the quantities of the at least one first engaging member 43 and the at least one second engaging member 53 for the end faces 42 and the abutting faces 52 abutting against each other correspond to each other.

FIGS. 4 and 5 show said configuration of the second embodiment, and the quantity of the at least one first engaging member 43 is two for each end face 42 of the magnet 40, with said two first engaging members 43 being disposed at an inner edge of each end face 42 and adjacent to the axial hole 41. The quantity of the at least one second engaging member 53 is also two and said second engaging members 53 are correspondingly disposed on the abutting face 52 of each fixing seat 50. Moreover, for said configuration, the at least one first engaging member 43 may be implemented as at least one groove and the at least one second engaging member 53 may be implemented as at least one protrusion.

Figure 6:
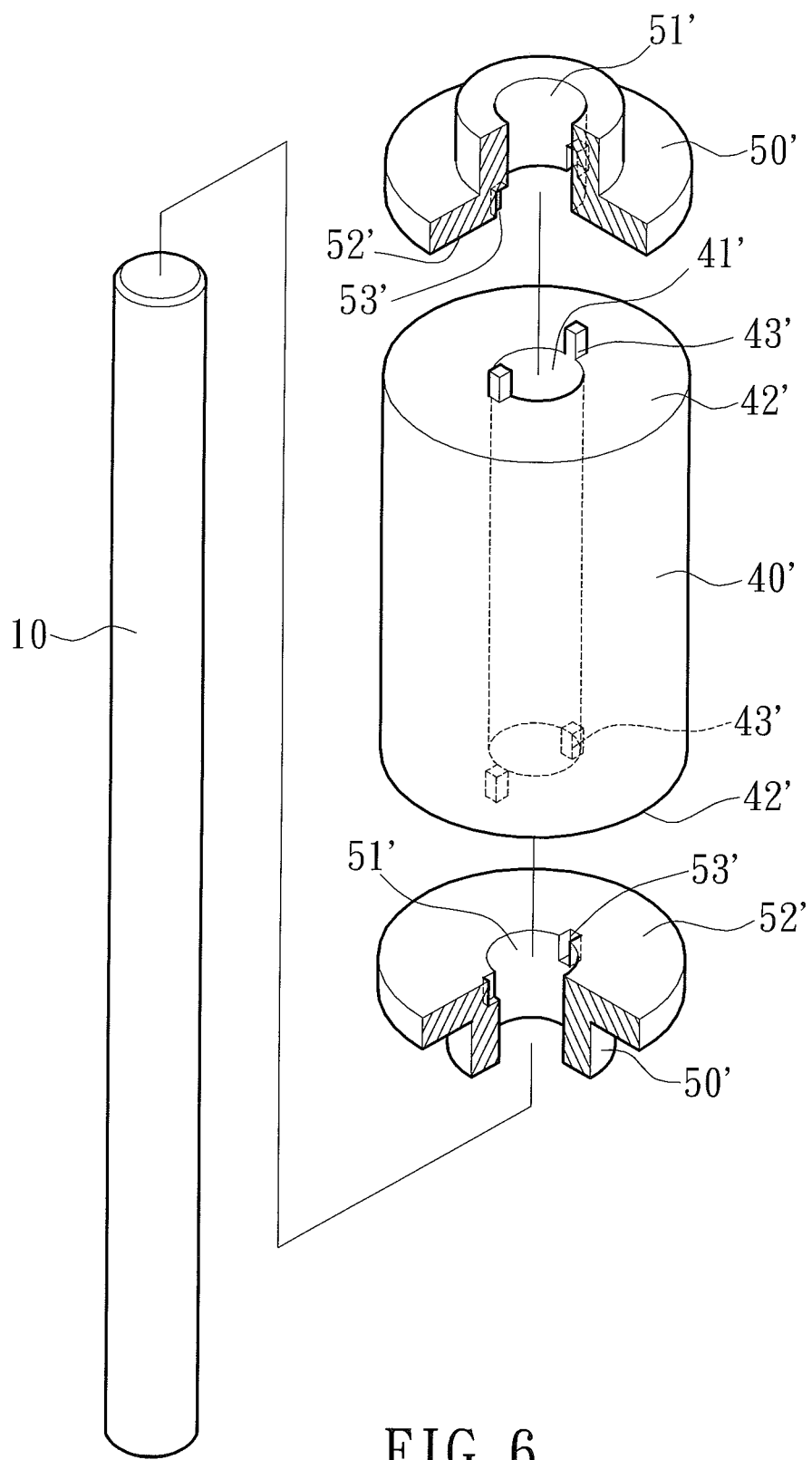
FIG. 6 is an exploded perspective view illustrating a rotor structure for a motor in accordance with another configuration of the second embodiment of the present invention.

Referring now to FIG. 6, a rotor structure for a motor in accordance with another configuration of the second embodiment is illustrated. Based on the rotor structure of the configuration, structures of the shaft 10, a magnet 40' having an axial hole 41' and two end faces 42' with at least one first engaging member 43', and two fixing seats 50' each having a positioning hole 51' and an abutting face 52' with at least one second engaging member 53', are similar to that of the second embodiment. The quantities of the at least one first and second engaging members 43', 53' for each end face 42' and abutting face 52' are two as shown. FIG. 6 shows said another configuration of the second embodiment, although the two first engaging members 43' are also disposed at an inner edge of each end face 42' adjacent to the axial hole 41' with the two second engaging members 53' facing and engaging therewith, two protrusions are selected as the two first engaging members 43', while two grooves are selected as the two second engaging members 53'.

Figure 7:
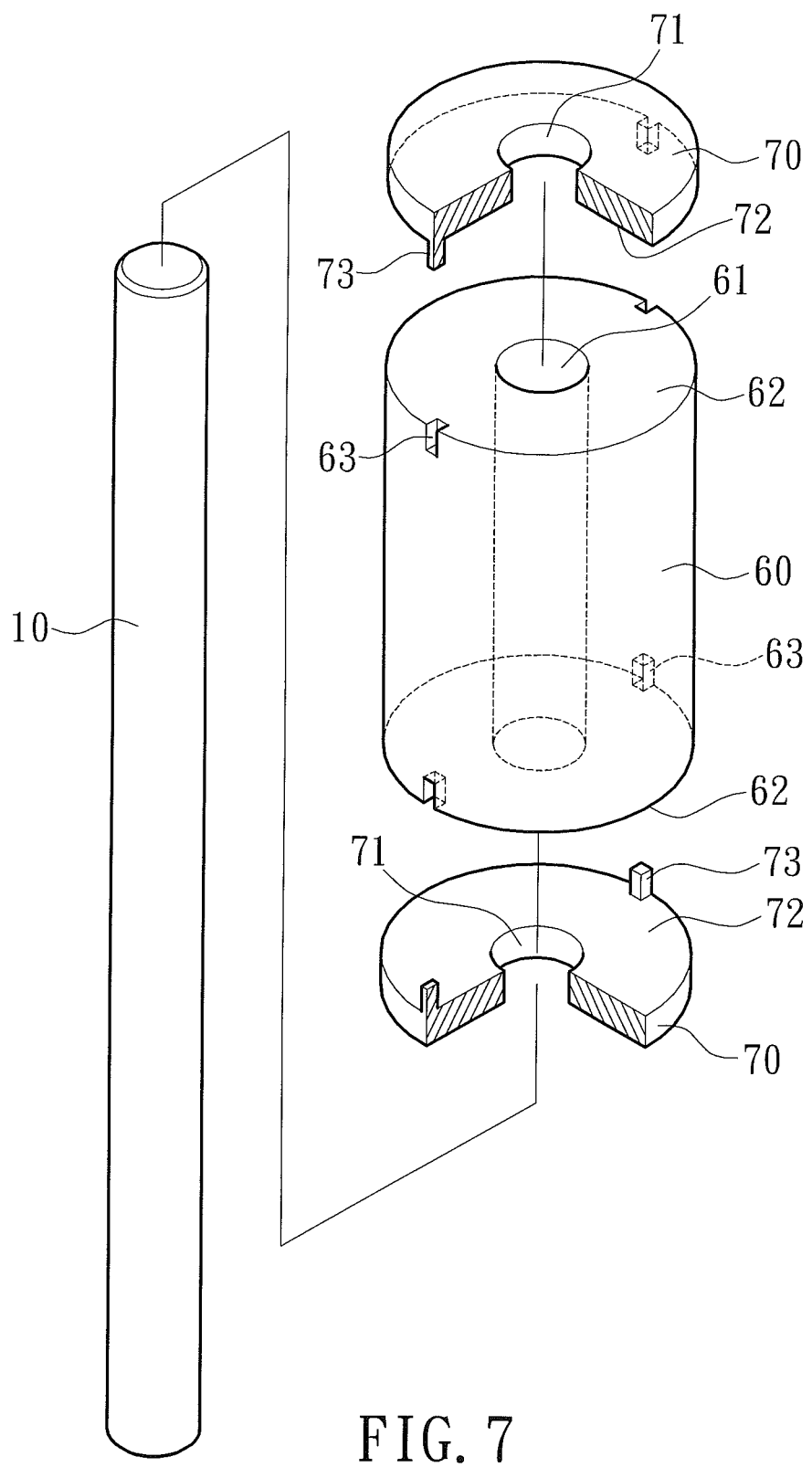
FIG. 7 is an exploded perspective view illustrating a rotor structure for a motor in accordance with a third embodiment of the present invention.
Figure 8:
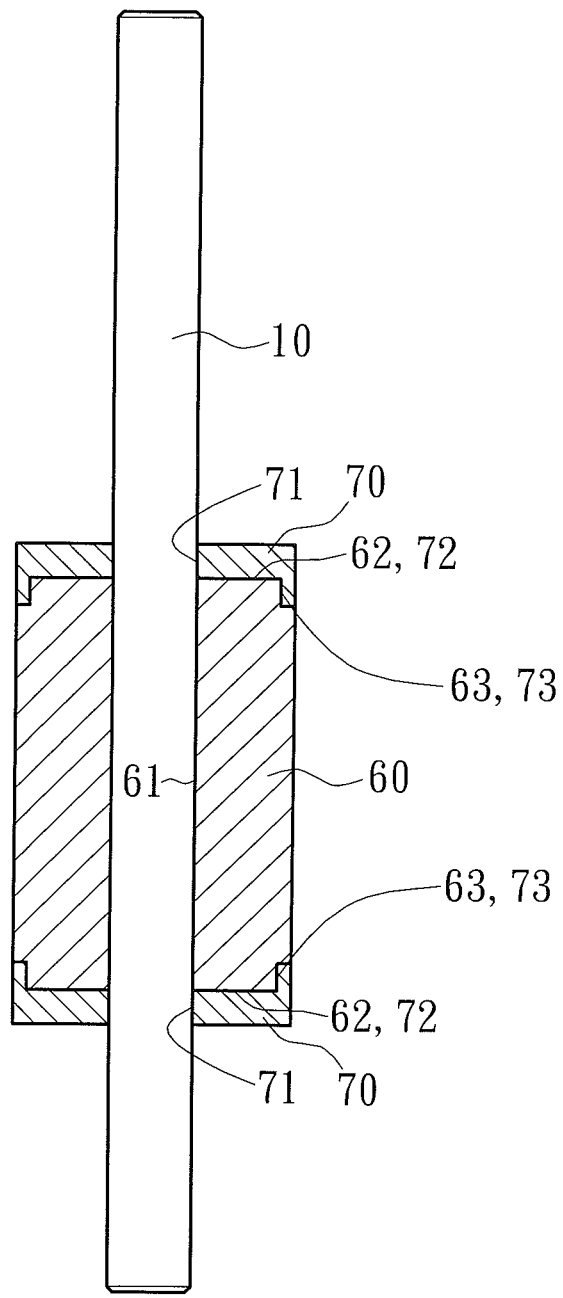
FIG. 8 is a cross-sectional side view illustrating the rotor structure for a motor in accordance with the third embodiment of the present invention.

Referring now to FIGS. 7 and 8, a rotor structure for a motor in accordance with a third embodiment is illustrated. Based on the rotor structure of the third embodiment, configurations of the shaft 10, a magnet 60 having an axial hole 61 and two end faces 62 with at least one first engaging member 63, and two fixing seats 70 each having a positioning hole 71 and an abutting face 72 with at least one second engaging member 73, are similar to that of the second embodiment. Although in FIGS. 7 and 8, the quantity of the at least one first engaging member 63 is also two for each end face 62 of the magnet 60, said two first engaging members 63 are disposed at an outer edge of each end face 62. The quantity of the at least one second engaging member 73 is also two and the second engaging members 73 are correspondingly disposed on the abutting face 72 of each fixing seat 70. Moreover, instead of the fixing seats 30, 50, 50' each having a sleeve around the positioning holes 31, 51 or 51' on surfaces opposite to the abutting faces 32, 52 or 52', the fixing seats 70 are in a shape of a simple flat plate or block.

Figure 9:
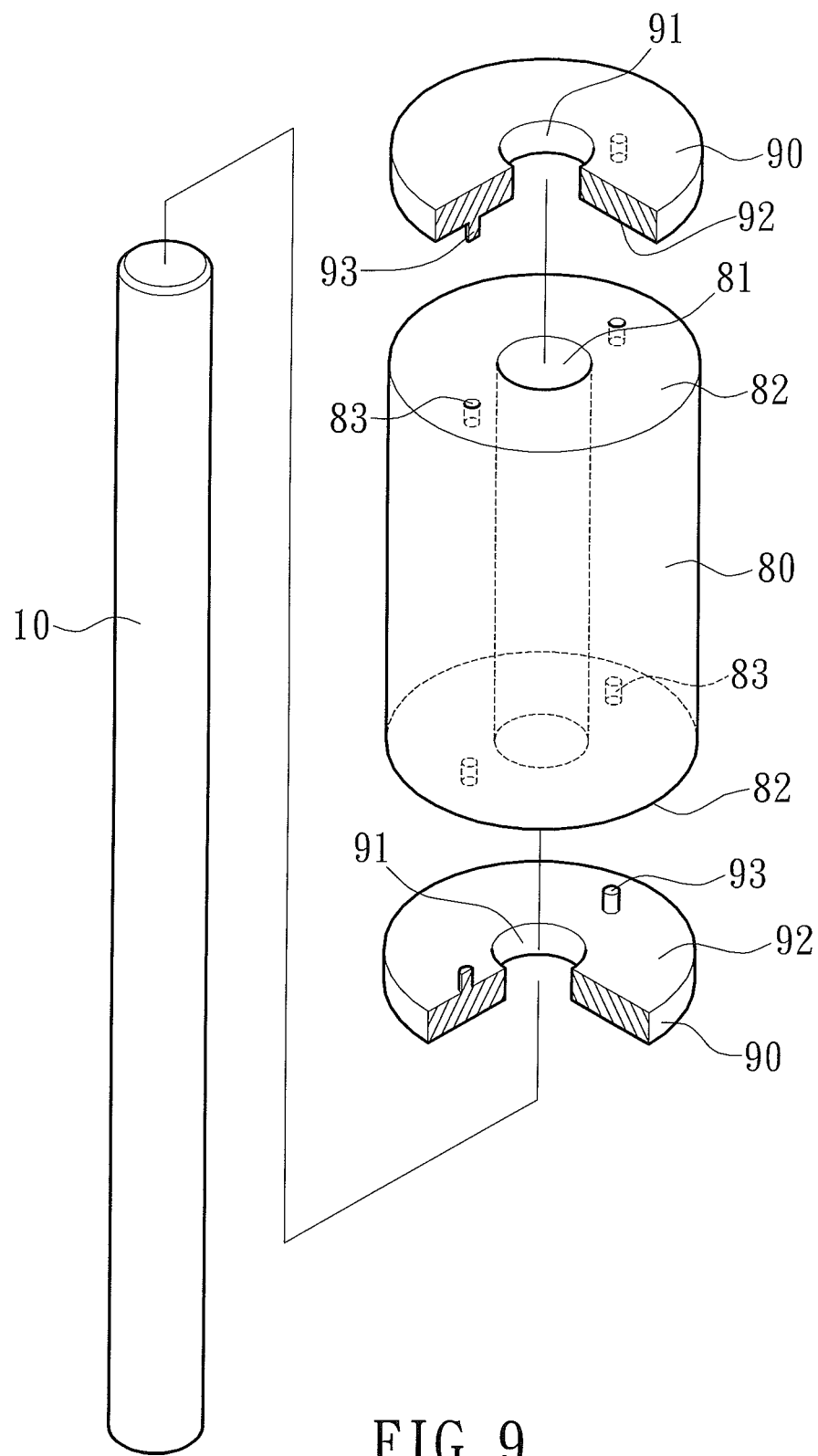
FIG. 9 is an exploded perspective view illustrating a rotor structure for a motor in accordance with a fourth embodiment of the present invention.
Figure 10:
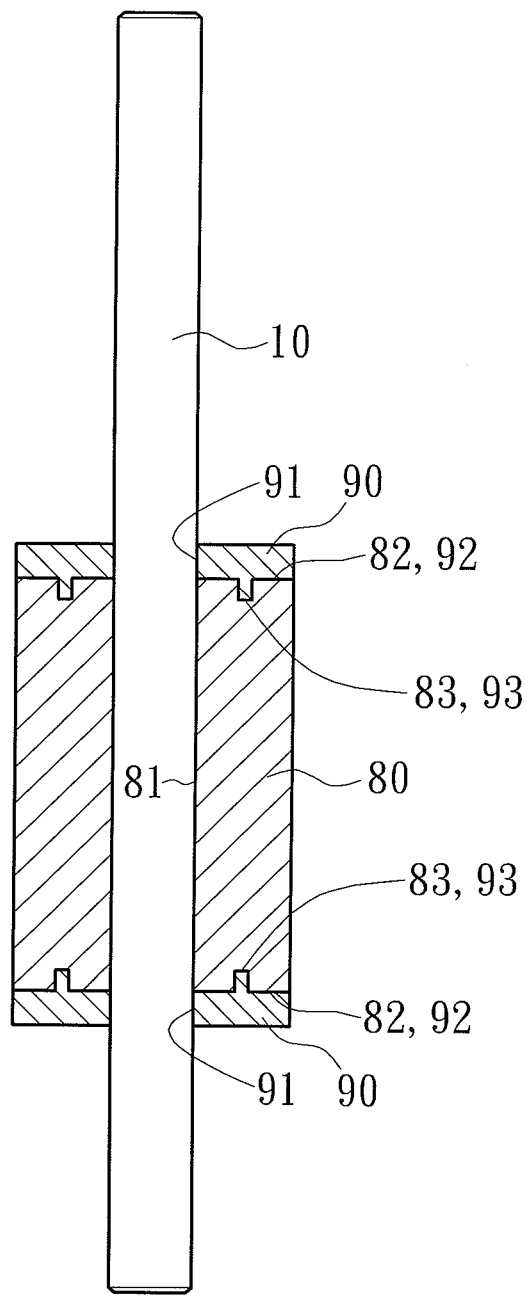
FIG. 10 is a cross-sectional side view illustrating the rotor structure for a motor in accordance with the fourth embodiment of the present invention.

Referring now to FIGS. 9 and 10, a rotor structure for a motor in accordance with a fourth embodiment is illustrated. Based on the rotor structure of the fourth embodiment, configurations of the shaft 10, a magnet 80 having an axial hole 81 and two end faces 82 with at least one first engaging member 83, and two fixing seats 90 each having a positioning hole 91 and an abutting face 92 with at least one second engaging member 93, are also similar to that of the second embodiment. Although in FIGS. 9 and 10, the quantity of the at least one first engaging member 83 is also two for each end face 82 of the magnet 80, said two first engaging members 83 are disposed on the end face 82 between inner and outer edges thereof.

Instead of the end faces 22 and the abutting face 32 having the form of rough surfaces of the first embodiment, the first engaging members 43, 43', 63, 83 and the second engaging members 53, 53', 73, 93 of the other embodiments can also provide a stable linkage between the shaft 10 and any of the magnets 20, 40, 40', 60, 80, and the magnets 20, 40, 40', 60, 80 are therefore able to synchronously revolve with the shaft 10.

Moreover, in order to provide a further stable-engaging effect between the magnets 20, 40, 40', 60, 80 and the fixing seats 30, 50, 50', 70, 90, the end faces 22, 42, 42', 62, 82 and the abutting faces 32, 52, 52', 72, 92 can not only provide at least one pair of the first engaging members 43, 43' 63, 83 and the second engaging members 53, 53', 73, 93, but can also be formed with the rough surfaces.

In comparison with the conventional rotor structure, the present invention can obviously provide two improvements as follow. Firstly, because the axial holes 21, 41, 41', 61, 81 of the magnets 20, 40, 40', 60, 80 fit with a small clearance or loosely fit the shafts 10 (i.e. the axial holes 21, 41, 41', 61, 81 have a diameter substantially equal to or slightly larger than the diameter of the shafts 10) while the positioning holes 31, 51, 51', 71, 91 of the fixing seats 30, 50, 50', 70, 90 tightly fit said shafts 10 (i.e. the positioning holes 31, 51, 51', 71, 91 have a diameter smaller than the diameter of the shaft 10), the fixing seats 30, 50, 50', 70, 90 can thereby position each of the magnets 20, 40, 40', 60, 80 at a predetermined position relative to each shaft 10. Therefore, rupture of the magnet caused by a "tight-fit design" of the shaft 10 and the magnet 20 and disengagement between the shaft 10 and magnet 20 are avoided. Secondly, the end faces 22, 42, 42', 62, 82 of the magnet 20, 40, 40', 60, 80 and the abutting faces 32, 52, 52', 72, 92 of the fixing seats 30, 50, 50', 70, 90 can be formed with rough surfaces, which correspondingly provide at least one pair of first engaging members 43, 43', 63, 83 and second engaging members 53, 53', 73, 93, or have both the rough surfaces and said first and second engaging members 43, 43' 63, 83, 53, 53' 73, 93, to achieve stable-engaging effect between the magnets 20, 40, 40', 60, 80 and fixing seats 30, 50, 50', 70, 90.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A rotor structure for a motor comprising:
 a shaft;
 a single magnet having two opposite end faces, wherein an axial hole extends along an axis through said two opposite end faces and has a maximum extent parallel to the axis equal to a maximum extent parallel to the axis between the two opposite end faces, wherein at least one of the two opposite end faces has at least one first engaging member being a groove extending parallel to the axis into the at least one of the two opposite end faces, wherein the single magnet and each of the two opposite end faces of the single magnet have a maximum radial extent perpendicular to the axis; and
 two fixing seats each having an abutting face, with each of the abutting faces having a maximum radial extent perpendicular to the axis the same as the maximum radial extent of the single magnet and of the two opposite end faces of the single magnet, with at least one of the abutting faces facing said at least one of the two opposite end faces and having at least one second engaging member facing and engaging with said at least one first engaging member, with a positioning hole disposed at the center of the abutting face, with the two fixing seats having circular cross sections perpendicular to the positioning hole and to the axis,
 wherein the shaft passes through the axial hole of the single magnet and the positioning holes of the two fixing seats, the two fixing seats are adjacent to and abut against the end faces of the single magnet by the abutting faces respectively to position the single magnet relatively to the shaft, both the positioning holes of the two fixing seats have a diameter smaller than that of said shaft to tightly fit said shaft, wherein the at least one first engaging member is located at the maximum radial extent at the outer edge of the at least one of the two opposite end faces, or located at the inner edge of the at least one of the two opposite end faces.

2. The rotor structure for the motor as defined in claim 1, wherein the axial hole of the single magnet has an equal diameter with the shaft.

3. The rotor structure for the motor as defined in claim 1, wherein the axial hole of the single magnet has a diameter larger than that of the shaft to loosely fit the shaft.

4. The rotor structure for the motor as defined in claim 1, wherein the at least one second engaging member is at least one protrusion.

5. The rotor structure for the motor as defined in claim 1, wherein each of the two opposite end faces of the single magnet is formed with a rough surface, the abutting face is formed with a rough surface, and the rough surfaces of the two opposite end faces and the abutting face provide friction therebetween to stably link the shaft and the single magnet.

6. A rotor structure for a motor comprising:
a shaft;
a single magnet having two opposite end faces, wherein an axial hole extends along an axis through said two opposite end faces and has a maximum extent parallel to the axis equal to a maximum extent parallel to the axis between the two opposite end faces, wherein at least one of the two opposite end faces has at least one first engaging member being a protrusion extending parallel to the axis from the at least one of the two opposite end faces, wherein the single magnet and each of the two opposite end faces of the single magnet have a maximum radial extent perpendicular to the axis; and two fixing seats each having an abutting face, with each of the abutting faces having a maximum radial extent perpendicular to the axis the same as the maximum radial extent of the single magnet and of the two opposite end faces of the single magnet, with at least one of the abutting faces facing said at least one of the two opposite end faces and having at least one second engaging member facing and engaging with said at least one first engaging member, with a positioning hole disposed at the center of the abutting face, with the two fixing seats having circular cross sections perpendicular to the positioning hole and to the axis, wherein the shaft passes through the axial hole of the single magnet and the positioning holes of the two fixing seats, the two fixing seats are adjacent to and abut against the end faces of the single magnet by the abutting faces respectively to position the single magnet relatively to the shaft, both the positioning holes of the two fixing seats have a diameter smaller than that of said shaft to tightly fit said shaft, wherein the protrusion is at an inner edge or an outer edge of the at least one of the two opposite end faces.

7. The rotor structure for the motor as defined in claim 6, wherein the at least one second engaging member is at least one groove.

8. The rotor structure for the motor as defined in claim 6, wherein the axial hole of the single magnet has an equal diameter with the shaft.

9. The rotor structure for the motor as defined in claim 6, wherein the axial hole of the single magnet has a diameter larger than that of the shaft to loosely fit the shaft.

10. The rotor structure for the motor as defined in claim 6, wherein each of the two opposite end faces of the single magnet is formed with a rough surface, the abutting face is formed with a rough surface, and the rough surfaces of the two opposite end faces and the abutting face provide friction therebetween to stably link the shaft and the single magnet.

\* \* \* \* \*